April 3, 1934. M. WOLFF 1,953,547
STEEL CHECK VALVE AND VALVE SEAT
Filed Nov. 20, 1931
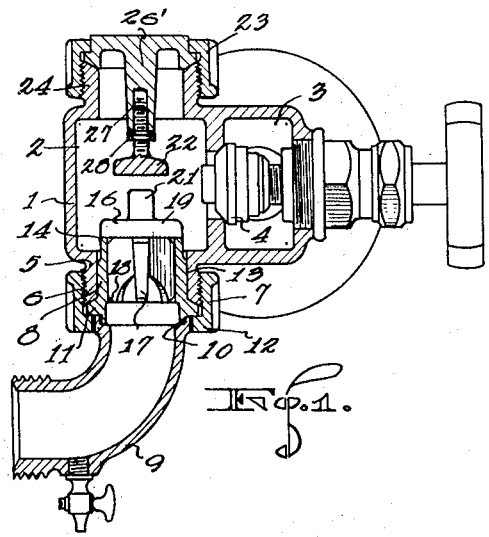
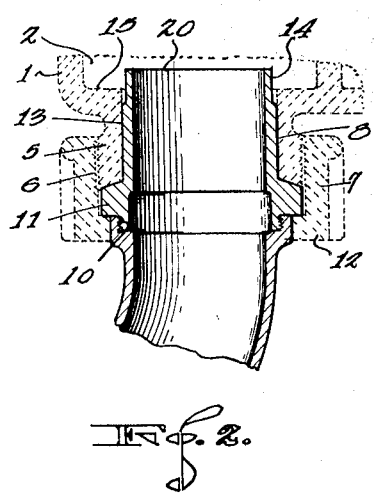
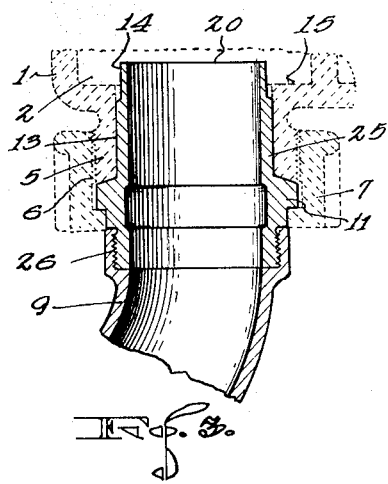
INVENTOR.
MATTHEW WOLFF.
BY
ATTORNEYS.

Patented Apr. 3, 1934

1,953,547

UNITED STATES PATENT OFFICE 1,953,547

STEEL CHECK VALVE AND VALVE SEAT

Matthew Wolff, Oakland, Calif.

Application November 20, 1931, Serial No. 576,373

5 Claims. (Cl. 251—127)

My invention relates to improvements in steel check valves and valve seats, and it consists of the combinations, constructions and arrangements hereinafter described and claimed.

Railroad locomotives are provided with injector feed water pump check valves and valve seats made of brass. The steam and hot water, in passing the check valve and seat, cut these parts because of the softness of the brass. The result is that the valves will leak very quickly sometimes after a day of service, and, usually after a week of service at the most, the valve seat must be reground.

The brass valve seat is integral with an elbow forming a part of the steam and hot water passage, and, after one or two reamings, a lip is formed on the seat which prevents the check valve from properly closing, and this necessitates the scrapping of the seat and elbow and the substitution of a new one. Steel has not been used in the manufacture of check valves and seats, because the steel castings, up to the present time, contained blow holes and the steam and hot water would leak through these holes.

I have found out that steel castings can now be made free from blow holes, and I have further found out that a steel check valve and seat will not be cut by steam and hot water, because it is harder than brass. The principal object of my invention is therefore to provide a steel check valve and seat in place of a brass check valve and seat. If desired, a seat can be made separable from the elbow, and the elbow continue to be made of brass.

A further object of my invention is to provide a steel check valve seat in which a relatively long portion of the seat may be used for reaming, thus increasing the life of the device.

In steam locomotive practice, the reaming portion of the valve seat extended to the wall of a casing that carried the seat. In my improved form of the device, I extend the reamable portion of the seat to a place beyond the wall of the supporting casing, and this permits the seat to be reamed a greater number of times.

Other objects and advantages will appear in the following specification, and the novel features of the device will be particularly pointed out in the appended claims.

My invention is illustrated in the accompanying drawing forming a part of this application, in which Figure 1 is a vertical section through the parts supporting the check valve and seat, and shows the seat as being separable from the elbow and shows the check valve in elevation;

Figure 2 is an enlarged view of the check valve seat; and

Figure 3 is a modified form of the valve seat.

In carrying out my invention, I make use of a casing, indicated generally at 1, and having a steam and water passageway 2 therein that communicates with a passageway 3. A hand valve 4 controls the flow of steam and hot water from the passageway 2 to the passageway 3.

The casing 1 has a tubular-depending portion 5 that is exteriorly threaded at 6 for receiving a nut 7. The tubular portion 5 receives a steel valve seat 8 of the shape shown in Figure 1. The valve seat 8 is removably connected to an elbow 9 at 10, and the elbow may be made from brass or steel. As already stated, the elbow may be integral with the valve seat if desired.

Referring to Figure 2, it will be noted that the valve seat 8 has an annular shoulder 11 that bears against the end of the tubular portion 5. The nut 7 has an inwardly-extending flange 12 for engaging with the shoulder 11 for holding it in position with respect to the casing 1. The outer surface 13 of the valve seat 8 contacts with the inner surface of the tubular portion 5, except for a reduced portion 14 of the valve seat. This reduced portion extends above a wall 15 of the casing 1 and projects a short distance into the tubular member 5, so that the outer surface of the reduced portion will be spaced away from the inner wall of the tubular member 5.

A steel check valve 16 is shown in Figure 1 and has a plurality of wings 17 that guide the valve with respect to the valve seat 8. The free ends of the wings 17 are chamfered at 18 for the purpose of permitting ready entrance of the valve 16 in the valve seat 8. The valve 16 has a disc-shaped portion 19 designed to seat on the rim 20, (see Figure 2), of the reduced portion 14. A head 21, (see Figure 1), extends above the disc 19 and strikes an adjustable stop 22 threaded in a support 26' which in turn is secured to the casing 1 by a nut 23. The stop limits the amount of opening of the valve 16.

From the foregoing description of the various parts of the device, the operation thereof may be readily understood.

The device, when used in a locomotive, will have the valve 16 open and close for each reciprocation of the feed water pump piston. During the opening movement of the valve 16, the steam and hot water will pass over the rim 20 and beneath the disc 16. The steel valve and steel valve seat will resist any cutting action of the steam and hot water for a considerable period of time. If wear finally does take place in the valve seat, the portion 14 can be reamed by merely removing the nut 23 that holds the stop 22, and then removing the stop and finally the valve 16. The reaming tool may now be inserted through the tubular portion 24 of the casing 1 and used in the usual manner for providing a perfect seat for the valve, and if the valve merely leaks a little, it can be quickly ground without reaming by using a compound.

A number of reamings can be made on the valve seat 8, and the valve seat need not be removed or replaced until the portion 14 has been entirely reamed away.

After the valve seat has been reamed and the valve replaced a number of times, too much space will be provided between the head 21 and the stop 22. In practice, where the stop was not adjustable, metal would be welded on and then machined down to the proper clearance. This requires considerable time and labor, and the welding cannot be done if the locomotive is to be used at once.

With the adjustable stop 22, only a short time is needed to adjust the stop to the proper clearance and then tighten the lock nuts 28.

In Figure 3, I show a slightly modified form of the invention. The valve seat 25 is similar to the valve seat 8 except that it has a threaded portion 26 projecting below the nut 7. This portion receives the elbow 9. In all other respects, the form of the device shown in Figure 3 is identical to that shown in Figures 1 and 2, and, therefore, like reference numerals will be used and further description is unnecessary.

While I have shown only the preferred forms of my invention, it should be understood that various changes or modifications may be made within the scope of the appended claims without departing from the spirit of the invention.

I claim:

1. In combination, a fitting, a valve seat threaded thereinto and having a shoulder resting on the fitting and projecting peripherally therebeyond, a casing having a reduced tubular section fitting over the valve seat and bearing on the shoulder, a gland clamping the shoulder to the tubular section, the valve seat having an upper end projecting beyond the tubular section and reduced in its outer diameter, a valve slidable in the valve seat and having a disc adapted for seating on the valve seat and having a head rising from the disc, a neck portion for the casing in axial alinement with the tubular portion and having a closure for the same, the inner diameter of the neck portion being substantially the same as the outer diameter of the upper valve seat end to admit a reaming tool, and a stop threaded into the closure from the inside in juxtaposition to the valve head.

2. In combination, a fitting, a valve seat threaded thereinto and having a shoulder resting on the fitting and projecting peripherally therebeyond, a casing having a reduced tubular section fitting over the valve seat and bearing on the shoulder, a gland clamping the shoulder to the tubular section, the valve seat having an upper end projecting beyond the tubular section and reduced in its outer diameter, a valve slidable in the valve seat and having a disc adapted for seating on the valve seat and having a head rising from the disc, a neck portion for the casing in axial alinement with the tubular portion and having a closure for the same, the inner diameter of the neck portion being substantially the same as the outer diameter of the upper valve seat end to admit a reaming tool, and a stop threaded into the closure from the inside in juxtaposition to the valve head, the valve seat and the valve being made of steel and the remainder of the assembly of softer material.

3. An article of manufacture comprising a fitting, a cylindrical valve seat threaded thereinto and having a valve on its upper end and having an outer shoulder near its lower end projecting beyond the fitting, a casing for the valve seat and the valve, and means for clamping the casing upon the outer shoulder.

4. In combination a fitting, a cylindrical valve seat threaded thereinto and having the upper portion of its outer surface reduced and having an outer shoulder near its lower end projecting beyond the fitting, a valve slidable in the valve seat and having a disc adapted to seat on the upper end of the same and being coextensive in its outer diameter therewith, a casing for the valve seat and the valve and means for clamping the casing upon the outer shoulder of the valve seat.

5. In combination, a fitting, a valve seat threaded thereinto and having a shoulder resting on the fitting and projecting peripherally therebeyond, a casing having a reduced tubular section fitting over the valve seat and bearing on the shoulder, a gland clamping the shoulder to the tubular section, the valve seat having an upper end projecting beyond the tubular section and reduced in its outer diameter, a valve slidable in the valve seat and having a disc adapted for seating on the valve seat and having a head rising from the disc, a neck portion for the casing in axial alinement with the tubular portion and having a closure for the same, the inner diameter of the neck portion being substantially the same as the outer diameter of the upper valve seat end to admit a reaming tool, and a stop projecting from the inside of the closure in juxtaposition to the valve head.

MATTHEW WOLFF.